United States Patent [19]

Miyazawa

[11] Patent Number: 4,639,839

[45] Date of Patent: Jan. 27, 1987

[54] VEHICULAR LIGHTING DEVICE HAVING A POWER DRIVEN LAMP COVER

[75] Inventor: Kenji Miyazawa, Shizuoka, Japan

[73] Assignee: Koito Seisakusho Co., Ltd., Tokyo, Japan

[21] Appl. No.: 833,865

[22] Filed: Feb. 27, 1986

[30] Foreign Application Priority Data

Aug. 9, 1985 [JP] Japan .............................. 60-175492

[51] Int. Cl.[4] ............................................. F21V 17/00
[52] U.S. Cl. .................................... 362/64; 362/375; 362/325
[58] Field of Search .................... 362/64, 61, 279, 375, 362/325, 276, 290, 324, 280, 281, 373; 74/337

[56] References Cited

U.S. PATENT DOCUMENTS

| | | | |
|---|---|---|---|
| 3,449,559 | 6/1969 | Licata et al. | 362/64 |
| 3,601,594 | 8/1971 | Carbary | 362/64 |
| 4,153,358 | 5/1979 | Yamada | 354/106 |
| 4,441,144 | 4/1984 | Horiuchi et al. | 362/375 |
| 4,443,836 | 4/1984 | Horiuchi et al. | 362/375 |
| 4,513,385 | 4/1985 | Lemme | 362/276 |
| 4,556,934 | 12/1985 | Lemme et al. | 362/325 |
| 4,556,935 | 12/1985 | Lemme | 362/325 |
| 4,567,549 | 1/1986 | Lemme | 362/279 |

Primary Examiner—Raymond A. Nelli
Attorney, Agent, or Firm—Browdy and Neimark

[57] ABSTRACT

A vehicular lamp assembly such as a combined fog and cornering lamp has a lamp cover mounted to its housing for pivotal movement between an open position, where the lamp cover uncovers the front lens of the lamp housing, and a closed position where the lamp cover covers the front lens. For pivoting the lamp cover between the open and closed positions a lamp cover drive mechanism comprises a drive shaft protruding from the lamp housing and coupled directly to the lamp cover. The drive shaft is driven by a reversible electric drive motor via a torque limiter which permits the motor to rotate independently of the drive shaft upon jamming of the lamp cover, as by being clogged with snow. Also included is an electric control circuit which controls the drive motor for opening and closing the lamp cover in response to the actuation and deactuation of a hand switch within easy reach of the vehicle driver. The control circuit further turns on the light source of the lamp assembly only when the lamp cover is opened. The lamp cover is further provided with a two way biasing mechanism which makes it unnecessary to hold the drive motor energized throughout the travel of the lamp cover between the open and closed positions.

8 Claims, 10 Drawing Figures

VEHICULAR LIGHTING DEVICE HAVING A POWER DRIVEN LAMP COVER

BACKGROUND OF THE INVENTION

This invention relates to lighting devices, to electric lamps and, more particularly, to an electric lamp assembly for use on motor vehicles. Still more particularly, the electric lamp assembly in accordance with the invention is equipped with a lamp cover which is powered for automatically uncovering the lamp when the same is lit up.

Some vehicular lighting devices, such as fog lamps and cornering lamps, are lit up occasionally rather than continuously or at very short intervals. When unlit, therefore, they should be covered for protection of their front lenses from dust, rain, snow, and stones or other matter that have been thrown up by other vehicles. Such lamps are usually lit up by the driver when the vehicle is running. Their front lenses should therefore be automatically uncovered when the lamps are switched on, and should be covered again when the lamps are switched off.

Several different types of lamp covers and their drive mechanisms have been suggested. Examples include Japanese Laid Open Utility Model Applications Nos. 59-163537 and 59-163538. A problem common to these known devices is that the lamp cover, pivoted on the lamp housing for covering and uncovering the front lens, is geared more or less directly to the electric reversible drive motor. Being constantly exposed to atmosphere, however, the lamp cover is susceptible to jamming as by snow or ice. If the drive motor is energized when the lamp cover is so locked against movement, either the motor or the gearing has been subject to destruction through overloading.

SUMMARY OF THE INVENTION

The present invention provides an improved vehicular lighting device having a lamp cover which can be power driven between an open and a closed position in relation to the switching of the light source on and off, without the danger of the overloading of the drive motor or associated gearing even in the event of the jamming of the lamp cover.

Stated briefly, the vehicular lighting device in accordance with the invention comprises a lamp assembly having a light source within a lamp housing for providing illumination through its front side. A lamp cover is mounted to the lamp housing of the lamp assembly for pivotal motion between an open position, where the lamp cover uncovers the front side of the lamp housing, and a closed position where the lamp cover covers the front side of the lamp housing. Mounted to the lamp housing is a lamp cover drive mechanism comprising a reversible electric drive motor, a drive shaft coupled to the lamp cover for pivoting the same between the open and closed positions by being driven by the drive motor, and a torque limiter interposed between the drive motor and the drive shaft for protecting the drive motor from overloading by allowing the drive motor to rotate independently of the drive shaft upon jamming of the lamp cover. The lighting device further includes an electric control circuit for operation the lamp cover drive mechanism, and for making on/off control of the light source, in response to a lam/cover control switch. The control circuit has first circuit means responsive to the actuation of the lamp/cover control switch for causing the drive motor of the lamp cover drive mechanism to rotate in a predetermined direction to an extent necessary for pivoting the lamp cover from the closed to the open position, the first circuit means being further responsive to the deactuation of the lamp/cover control switch for causing the drive motor to rotate in an opposite direction to an extent necessary for pivoting the lamp cover from the open to to the closed position, and second circuit means associated with the first circuit means for lighting up the light source of the lamp assembly when the lamp cover is in the open position.

The operator may inadvertently actuate the lamp/cover control switch for opening or closing the lamp cover and for lighting up or putting out the light source when the lamp cover is locked against movement for some reason or other. Even though the drive motor will then be set into rotation in a required direction, the torque limiter will operate to substantially disconnect the motor from the lamp cover drive shaft, thereby preventing the destruction of the motor as well as of associated transmission means such as gearing. The torque limiter offers an additional advantage. When the lamp cover drive mechanism malfunctions, either mechanically or electrically, failing to drive the lamp cover, this lamp cover will be readily opened or closed manually.

It should also be appreciated that in the above summarized lighting device of this invention, only the lamp/cover control switch need be manipulated both for the on/off control of the light source and for the opening and closing of the lamp cover. Further the light source is to glow when the lamp cover is opened, rather than when the lamp/cover control switch is actuated. There is accordingly no possibility of the light source glowing when the lamp cover is closed, or of the lamp cover left open when the light source is now glowing.

A further feature of this invention resides in a two way biasing mechanism including resilient means acting on the lamp cover so as to bias the same toward the open or closed position depending upon the angular position of the lamp cover therebetween. Neutralized when the lamp cover is just midway between the open and closed positions, the two way biasing mechanism biases the lamp cover toward the open position when the lamp cover travels past the midpoint toward the open position, and toward the closed position when the lamp cover travels past the midpoint toward the closed position. It is therefore unnecessary to hold the drive motor energized throughout the travel of the lamp cover in either direction between the open and closed positions. The two way biasing mechanism serves the additional purpose of positively holding the lamp cover in the open and closed positions as it incorporates stop means for bearing against the forces of the resilient means in the two extreme positions of the lamp cover.

The above and other features and advantages of this invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENT

General

The veicular lighting device of our invention will now be described in terms of the combined fog and cornering lamp assembly generally designated 10 in FIG. 1. The lamp assembly 10 is herein shown together with a lamp cover 12 and its drive mechanism 14. As illustrated in detail in FIGS. 2 and 3, the lamp cover drive mechanism 14 comprises a drive assembly 16 including a reversible electric drive motor 18 coupled via a torque limiter 20, FIG. 3, to the lamp cover 12. The lamp cover drive mechanism 14 further comprises an electric control circuit assembly 22 which controls the operation of the drive motor 18 in relation to the switching on and off of the light source, not shown in FIGS. 1 through 3, of the lamp assembly 10. The control circuit assembly 22 is mechanically coupled to the drive assembly 16 via a circuit assembly holder frame 24. Included in the control circuit assembly 22 is a motor switch 26, FIG. 3, which is actuated by the drive assembly 16 for the on/off and directional control of the drive motor 18. As will be seen from FIG. 2, the drive assembly 16, control circuit assembly 22 and holder frame 24 of the lamp cover drive mechanism 14 are all compactly received in an enclosure 28 to be mounted within the lamp assembly 10.

What follows is a more detailed discussion of the noted lamp assembly 10, lamp cover 12, drive assembly 16, torque limiter 20, control circuit assembly 22, and motor switch 26, as well as the electrical configuration of the control circuit assembly 22, followed by the operational description of the complete lamp cover drive mechanism 14.

Lamp Assembly

Figure 1:
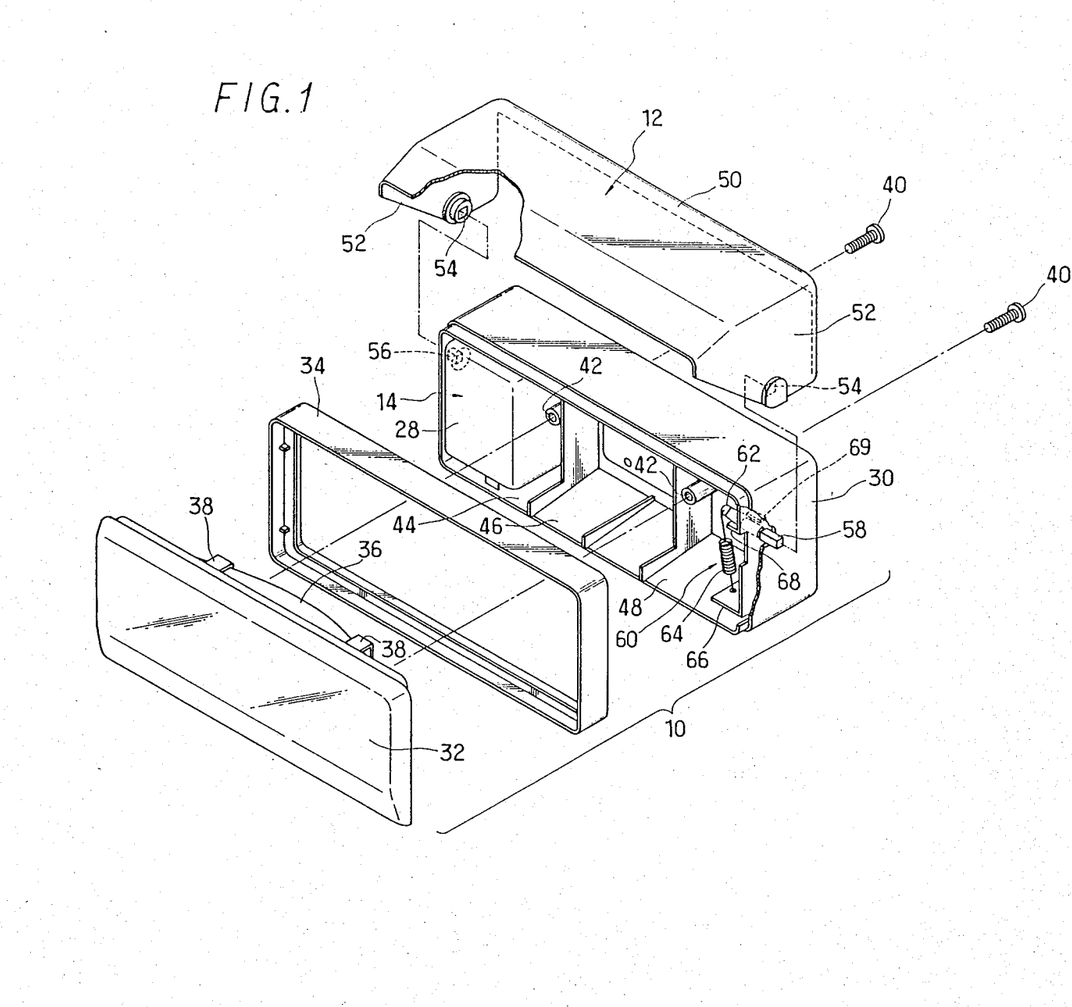
FIG. 1 is an exploded perspective view of a combined fog and cornering lamp assembly equipped with a lamp cover and its drive mechanism in accordance with the novel concepts of the present invention.

With reference to FIG. 1 the combined for and cornering lamp assembly 10 has a lamp housing 30 in the form of a box rather elongated horizontally and having an open front side closed by a rectangular lens 32 via a lens holder frame 34. Disposed behind the lens 32 and coupled fast thereto is a paraboloidal reflector 36 for producing parallel rays of light from the light source which are being directed forwardly of the lamp assembly 10 through the lens 32. Another paraboloidal reflector of much smaller size, not shown, is pivotally mounted forwardly of the first named reflector 36, which is fixed to the lens 32, for throwing part of the light rays from the source toward either side of the vehicle in the use of the lamp assembly 10 as cornering lamp. The fixed reflector 36 has a pair of screw seats 38 welded or otherwise secured thereto. The fixed reflector 36 together with the lens 32 and the unshown movable reflector and light source is mounted to the lamp housing 30 by threadedly receiving in the screw seats 38 a pair of screws 40 which are inserted into and through holes 42 in the lamp housing from its back.

The interior of the lamp housing 30 is partitioned into a left hand compartment 44 for accommodating the lamp cover drive mechanism 14, a central compartment 46 for mostly accommodating the fixed reflector 36, and a right hand compartment 48 for mostly acccommodating a two way reflector drive mechanism, not shown, for driving the unshown movable reflector.

The combined fog and cornering lamp assembly of this general configuration is more fully described and claimed in a separate application filed substantially concurrently herewith under the title of "Dual Purpose Lamp Assembly for Use, for Example, as a Combined Fog and Cornering Lamp on a Motor Vehicle".

Lamp Cover

As shown also in FIG. 1, the lamp cover 12 comprises a major portion 50 of approximately the same size and shape as the lens 32, and a pair of side flanges 52 at both lateral ends of the major portion. The side flanges 52 of the lamp cover 14 have a pair of holes 54 of square or otherwise noncircular cross section formed one in each side flange for nonrotatably receiving a pair of trunnions 56 and 58 rotatably protruding from the opposite sides of the lamp housing 30 in coaxial relation to each other. Thus the lamp cover 12 is pivotable with respect to the housing 30 between an open position of FIG. 1, where it thoroughly uncovers the lens 32 of the lamp assembly 10, and a closed position where the lamp cover covers the lens with its major portion 50. Of course, the lamp cover 12 lies in the closed position when the lamp assembly 10 is unlit, and is pivoted to the open position when the lamp assembly is lit up. Such angular displacement of the lamp cover 12 is effected automatically by the lamp cover drive mechanism 14 as the lamp assembly 10 is switched on or off. The angular distance between the open and closed may be approximately 90 degrees.

The left hand trunnion 56, as viewed in FIG. 1, is the drive shaft of the lamp cover 12, forming a part of the lamp cover drive mechanism 14. More precisely, however, this trunnion is a square sectioned collar or sleeve which is pressfitted onto one end of a drive shaft included in the drive assembly 16, FIGS. 2 and 3, of the lamp cover drive mechanism, as will be explained in more detail during the following description of the drive assembly.

The right hand trunnion 58, on the other hand, is provided with a two way biasing mechanism 60 disposed in the right hand compartment 48 of the lamp housing 30. The two way biasing mechanism 60 comprises a crank arm 62 having a proximal end non-rotatably coupled to the right hand trunnion 58 and extending right angularly therefrom, and a helical tension spring 64 acting between the distal end of the crank arm 62 and a spring retainer ledge 66 on one of the opposite side walls of the housing 30. The tension spring 64 biases the right hand trunnion 58 and hence the lamp cover 12 toward either of the open and closed positions depending upon its angular position and becomes neutral, biasing the lamp cover toward neither position, when the same is approximately at a midpoint between the two positions. The crank arm 62 is provided with a pair of stops 68 and 69 affixed to the lamp housing 30 for positively holding the lamp cover 12 in the open and closed positions under the force of the tension spring 64.

Drive Assembly

Figure 2:
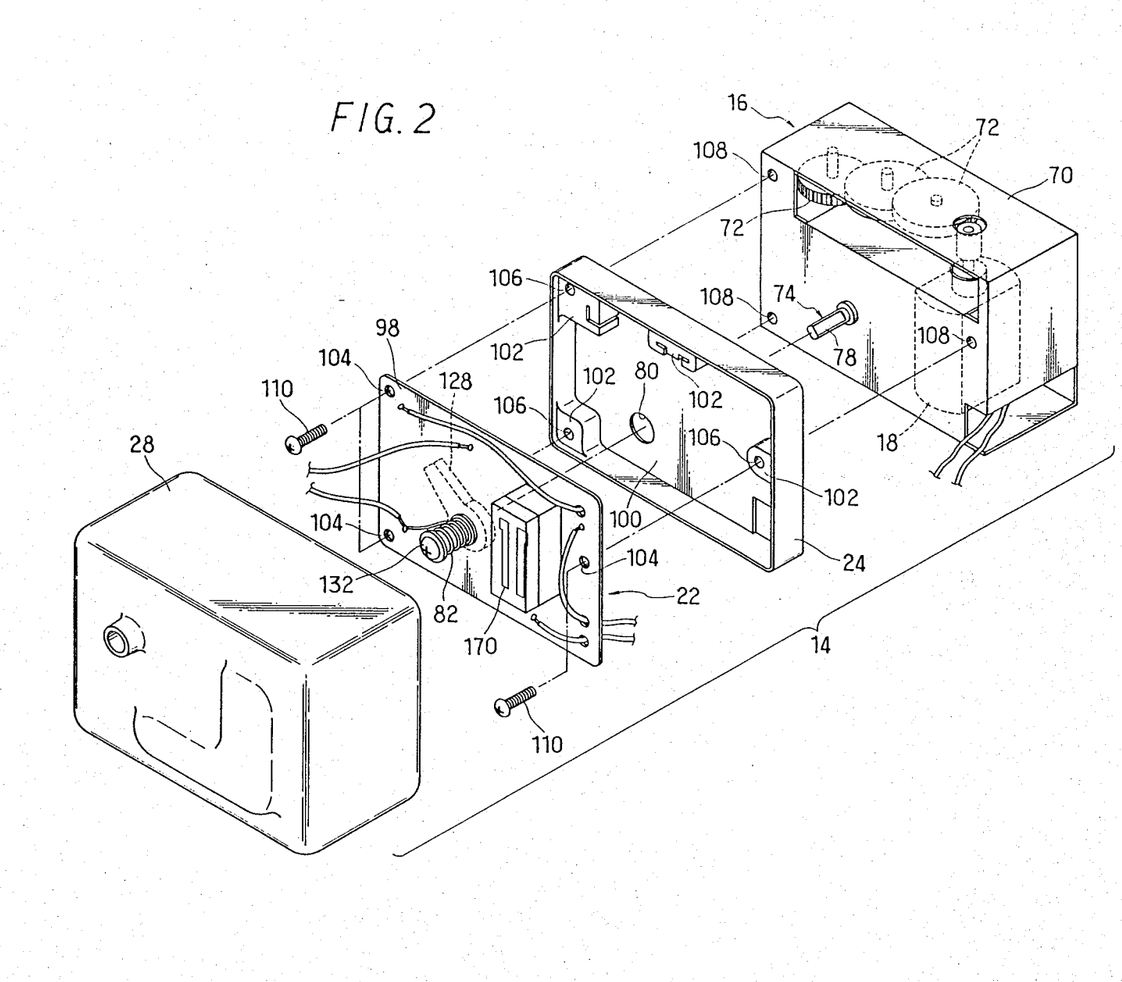
FIG. 2 is an enlarged, exploded perspective view of the lamp cover drive mechanism incorporated with the combined fog and cornering lamp assembly of FIG. 1.
Figure 3:
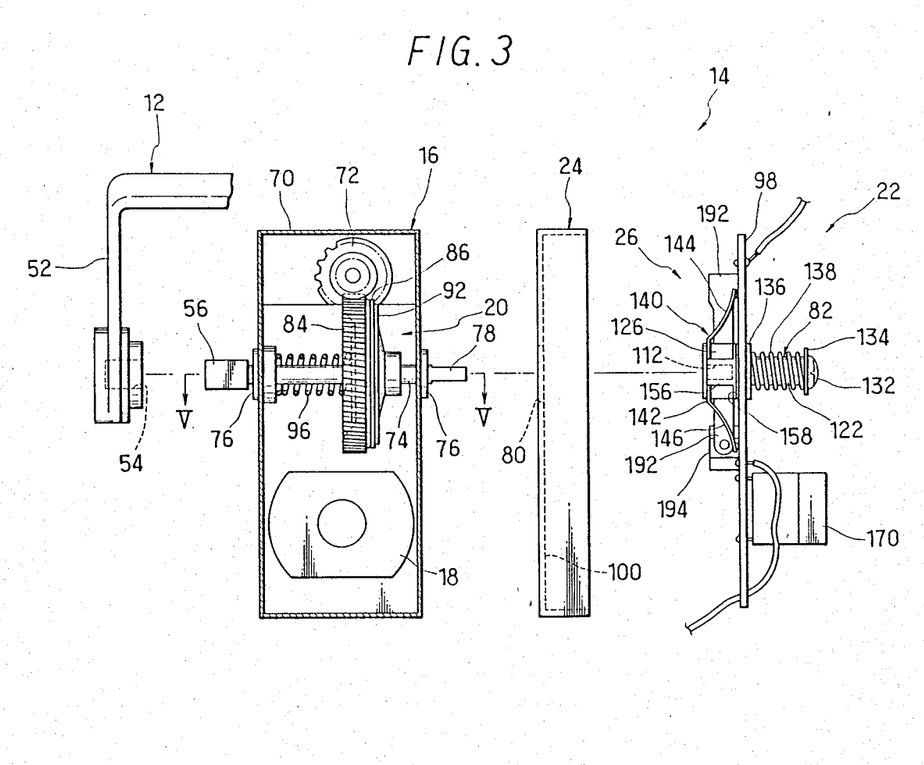
FIG. 3 is an exploded plan view of some important components of the lamp cover drive mechanism of FIG. 2, shown together with part of the lamp cover.

As shown in both FIGS. 2 and 3, the drive assembly 16 has a drive housing 70 of generally boxlike shape for accommodating the various working parts of the assembly set forth hereafter. Among them is the noted reversible drive motor 18 coupled via gearing 72 and the noted torque limiter 20 to the drive shaft 74. This drive shaft is rotatably supported across the drive housing 70 via a pair of sleeve bearings 76. The left hand end, as seen in FIG. 3, of the drive shaft 74 protrudes outwardly of the drive housing 70 and has pressfitted thereon the square sectioned collar or sleeve 56 which is nonrotatably engaged as aforesaid in one of the holes 54 in the side flanges 52 of the lamp cover 12.

The right hand end 78, on the other hand, of the drive shaft 74 also protrudes outwardly of the drive housing 70. This end 78 of the drive shaft 74 is flattened or otherwise made noncircular in cross section for driving engagement, via a hole 80 in the circuit assembly holder frame 24, with a rotary switch actuator member 82 included in the electric control circuit assembly 22. The switch actuator member 80 is associated with the motor switch 26 as well as with a lamp switch to be described presently.

Torque Limiter

Figure 4:
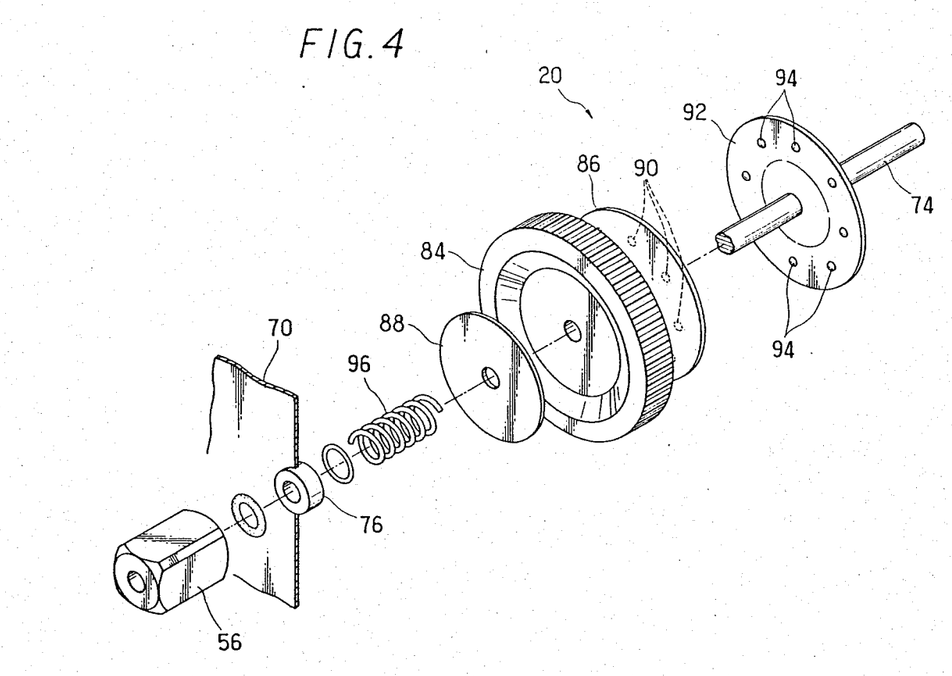
FIG. 4 is an enlarged, exploded perspective view of the torque limiter in the lamp cover drive mechanism of FIGS. 2 and 3.
Figure 5:
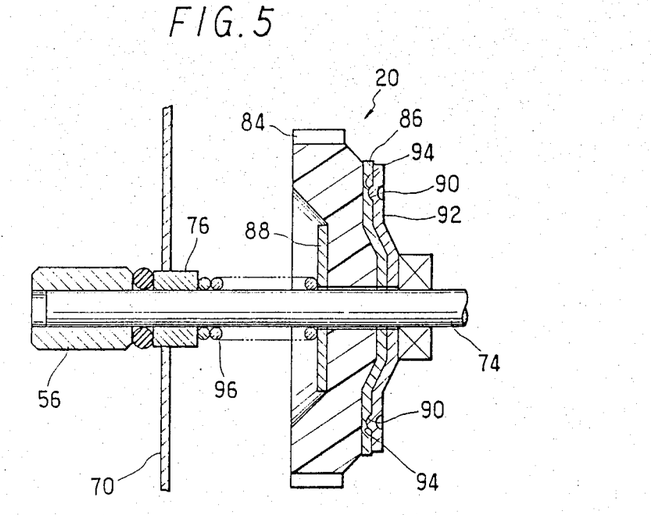
FIG. 5 is a still more enlarged axial section through the torque limiter of FIG. 4, taken along the line V—V of FIG. 3.

Although the torque limiter 20 appears in FIG. 3, its construction is better illustrated in FIGS. 4 and 5. The aforesaid gearing 72 of the drive assembly 16 includes a final gear 84 which can be a worm wheel in practice. This final gear is loosely mounted on the drive shaft 74 for both axial and angular displacement. Preferably, and as indicated by the hatching in FIG. 5, the final gear 84 is a molding of rigid plastic material and has two metal facings 86 and 88 secured to its opposite sides. The right hand metal facing 86 is intended to serve as a drive disc of the torque limiter 20, loosely mounted on the drive shaft 74. As the final gear 84 of rigid plastic is forcibly driven by the drive motor 18, so is the drive disc 86 which is affixed to the final gear. The drive disc 86 has a plurality of concavities 90 formed in its surface away from the ginal gear 84. The concavities 90 are disposed annularly at constant angular spacings about the axis of the drive shaft 74.

Disposed opposite the drive disc 86 is a driven disc 92 which also is metal made and which is fixedly mounted on the drive shaft 74. The driven disc 92 has a plurality of convexities 94 formed on its surface directed toward the drive disc 86. The convexities 94 are also of annular arrangement about the axis of the drive shaft 74, capable of engagement in, and disengagement from, the respective concavities 90 in the drive disc 86. Notwithstanding the showings of FIGS. 4 and 5, however, the concavities 90 could be formed in the driven disc 92, and the convexities 94 on the drive disc 86, all that is required being that the drive and driven discs be interengageable so as to transmit motor output torque up to a prescribed limit.

The left hand metal facing 88 of the final gear 84 is intended to serve as a seat for one end of a helical compression spring 96. The other end of this compression spring is seated against one of the sleeve bearings 76 rotatably supporting the drive shaft 74 on the drive housing 70.

Thus, under pressure from the compression spring 96, the final gear 84 normally has its right hand metal facing or drive disc 86 in close face to face contact with the driven disc 92 non-rotatably mounted on the drive shaft 74, with the concavities 90 in the drive disc receiving the respective convexities 94 on the driven disc. The bidirectional rotation of the drive motor 18, and hence of the final gear 84, is then transmitted from the drive disc 86 to the driven disc 92 via the interengaging concavities 90 and convexities 94. The driven disc 92 in turn causes the rotation of the drive shaft 74 and, in consequence, the pivotal motion of the lamp cover 12 between the open and closed positions.

Upon jamming of the lamp cover 12, locked against pivotal motion in either the open or closed position, or anywhere therebetween, the motor driven rotation of the drive disc 86 will result in the disengagement of its concavities 90 from the convexities 94 on the driven disc 92, with the final gear 84 displaced axially leftwardly of the drive shaft 74 against the force of the compression spring 96. Then the drive disc 86 will rotate with the final gear 84 unloaded by the lamp cover 12. Both drive shaft 18 and gear train 72 will thus be saved from destruction due to overloading.

During such rotation of the drive disc 86 disconnected from the driven disc 92, their concavities 90 and convexities 94 will repeat interengagement with, and disengagement from, each other, resulting in the production of a series of clicks. These clicks will serve as an alarm signal, informing the vehicle driver of the jamming of the lamp cover 12.

Electric Control Circuit Assembly

With reference again to FIGS. 2 and 3 the electric control circuit assembly 22 includes a rectangular circuit board 98 having various circuit means mounted thereto as will be set forth hereafter. The circuit board 98 is supported by the holder frame 24 of sturdier construction. The holder frame 24 is generally in the form of a thin box, with one side left open to receive the circuit board 98 and with the opposite side closed by a wall 100 held against the drive assembly 16. Several bosses 102 are formed within the holder frame 24 by way of spacers for holding the circuit board 98 a required distance away from the wall 100.

The circuit board 98 has mounted thereto the noted motor switch 26 (and an additional switch) activated by the flattened end 78 of the drive shaft 74. It is therefore desirable that the circuit board 98 be secured to the drive assembly housing 70 via the holder frame 24.

Toward this end the circuit board 98 has defined therein several screw holes 104 in register with holes 106 in the holder frame bosses 102 and with tapped holes 108 in the drive assembly housing 70. Screws 110 are inserted into and through the holes 104 and 106 and are engaged in the tapped holes 108, thereby fastening the circuit board 98 to the drive assembly housing 70 via the holder frame 24.

Figure 6:
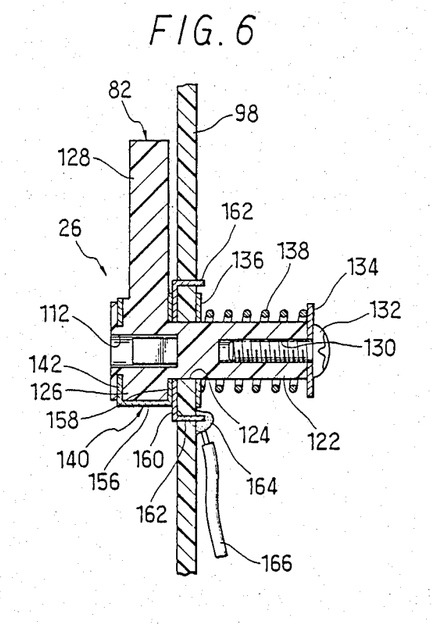
FIG. 6 is an enlarged, fragmentary section through the electric control circuit board in the lamp cover drive mechanism of FIGS. 2 and 3, showing in particular the mechanical construction of part of a motor switch and of a lamp switch on the circuit board.

As the circuit board 98 is fastened as above to the drive assembly housing 70, the drive shaft end 78 passes the hole 80 in the holder frame wall 100 to be inserted in a hole 112, FIGS. 3 and 6, defined endwise in the rotary switch actuator member 82 on the circuit board 98. the hole 112 has a cross sectional shape corresponding to that of the drive shaft end 78, so that the bidirectional rotation of the drive shaft 74 is imparted not only to the lamp cover 12 but also to the switch actuator member 82.

The combination of the drive assembly 16, control circuit assembly 22 and holder frame 24, fastened together as above explained, is mounted within the boxlike enclosure 28 to make up the lamp cover drive mechanism 14. Being so compact, this lamp cover drive mechanism 14 can be mounted in one of the three compartments 44, 46 and 48, FIG. 1, of the lamp housing 30, leaving enough space therein for the installation of the other components of the combined fog and cornering lamp assembly 10, as will be understood by referring to the aforementioned application filed concurrently herewith.

Motor Switch Construction

The mechanical construction of the motor switch 26 will become apparent from a consideration of FIGS. 3 and 6. Prior to the study of these figures, however, the circuit means of the circuit board 98 will be briefly explained with reference to FIGS. 7 through 10 for a better understanding of the mechanical design of the motor switch 26. The circuit board 98 has mounted on its side directed toward the drive assembly 16 the motor switch 26 and a lamp switch 114. The motor switch 26 coacts with first 116 and second 118 motor direction switches for making the on/off and directional controls of the drive motor 18. The lamp switch 114 makes the on/off control of the light source 120 of the combined fog and cornering lamp assembly 10, the light source being disposed behind the lens 32, FIG. 1, of the lamp assembly. Driven by the drive shaft 74, the rotary switch actuator member 82 actuates both the motor switch 26 and the lamp switch 114.

With reference back to FIGS. 3 and 6 the rotary switch actuator member 82 comprises a shank or stem 122 of cylindrical shape rotatably extending through a hole 124 in the circuit board 98. The left hand end 126, as seen in FIGS. 3 and 6, of the stem 122, is enlarged to a diameter considerably more than that of the hole 124 and has a switch actuator arm 128 extending radially outwardly therefrom. The switch actuator arm 128 is intended for the actuation of the lamp switch 114, as will be seen from FIGS. 7 and 9.

The aforesaid hole 112 for the driving engagement of the drive shaft end 78 is formed in the enlarged end 126 of the rotary switch actuator member stem 122. This stem must therefore be coaxial with the drive shaft 74. The right hand end of the stem 122 has a tapped hole 130 defined axially therein. A screw 132 is engaged in this tapped hole 130 for holding a spring retainer flange 134 endwise against the stem 122. Another spring retainer 136 is secured flatwise against the circuit board 98 so as to encircle the stem 122. Extending between the two spring retainers 134 and 136, a compression spring 138 biases the rotary switch actuator member 82 longitudinally away from the drive assembly 16 for rotatably holding the switch actuator member in place on the circuit board 98.

The reference numeral 140 denotes a movable contact member made of resilient sheet metal material and forming a part of the motor switch 26. As will be seen also from FIGS. 7 through 10, the movable contact member 140 has an approximately square midportion 142 affixed to the enlarged end 126 of the rotary switch actuator member 82, and a pair of arms 144 and 146 extending in diametrically opposite directions away from the midportion 142 and terminating in movable contacts 148 and 150 respectively. The midportion 142 of the movable contact member 140 is bored for the passage of the drive shaft end 78 therethrough into driving engagement in the switch actuator member hole 112. The pair of movable contact member arms 144 and 146 are bent toward the circuit board 98 as they extend away from the midportion 142, and are self biased for the sliding engagement of the movable contacts 148 and 150 with two fixed contacts 152 and 154, respectively, of arcuate shape formed on the circuit board 98.

The movable contact member 140 with its two movable contacts 148 and 150 and the two fixed contacts 152 and 154 constitute in combination the motor switch 26. FIGS. 7 through 10 indicate that a line connecting the movable contacts 148 and 150 of the motor switch 26 is at right angles with the switch actuator arm 128 acting on the lamp switch 114.

Referring once again to FIGS. 3 and 6, the midportion 142 of the movable contact member 140 has a connective portion 156 bent right angularly therefrom to electrically connect the movable contact member to its sliding base 158 around the switch actuator member stem 122. The sliding base 158 is in constant sliding contact with a fixed terminal member 160, also made of sheet metal, on the circuit board 98. The terminal member 160 has legs 162 embedded in the circuit board 98 and partly protruding to its opposite side. The protruding end of one of the terminal member legs 162 is soldered or otherwise electrically connected at 164 to a cable 166 leading to the anode of a power supply as indicated at 168 in FIGS. 8 and 10. It will be observed that the movable contact member siding base 158 can remain in proper sliding contact with the positive supply terminal member 160 as the compression spring 138 urges the former against the latter.

Electrical Configuration of Control Circuit Assembly

Figure 7:
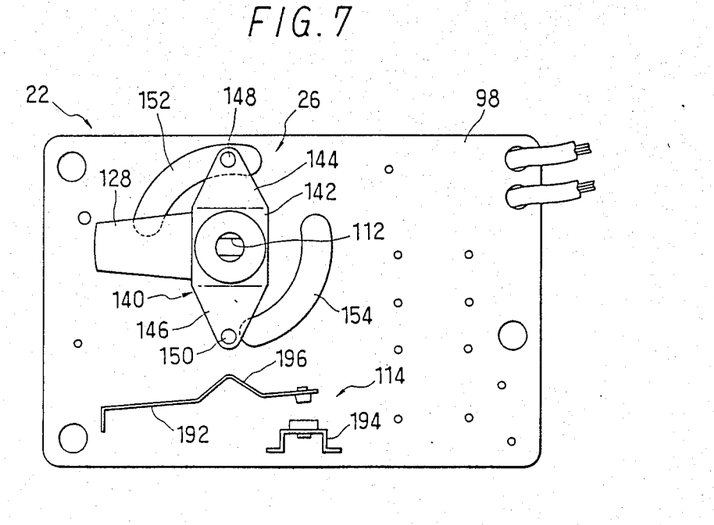
FIG. 7 is a plan view of the control circuit board of FIG. 6, shown in its state when the lamp cover is closed.
Figure 8:
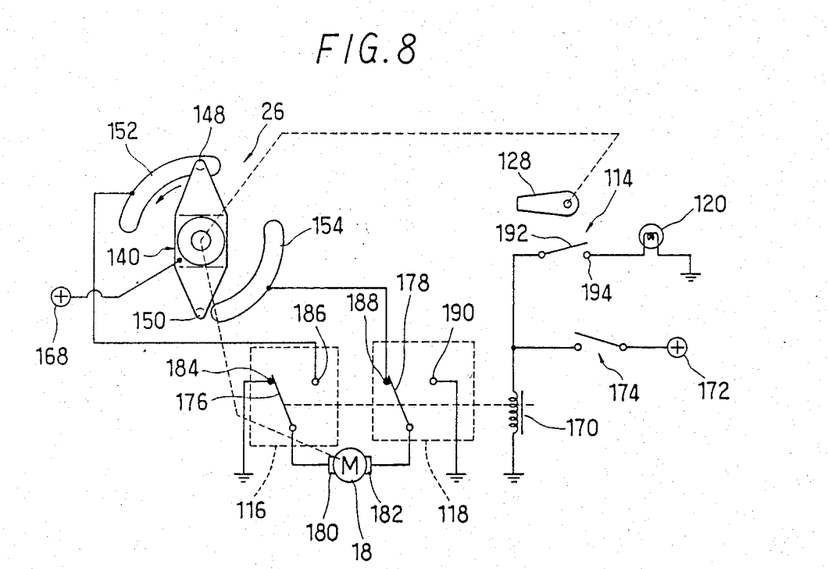
FIG. 8 is a schematic electrical diagram of the control circuit, shown also in its state when the lamp cover is closed.
Figure 9:
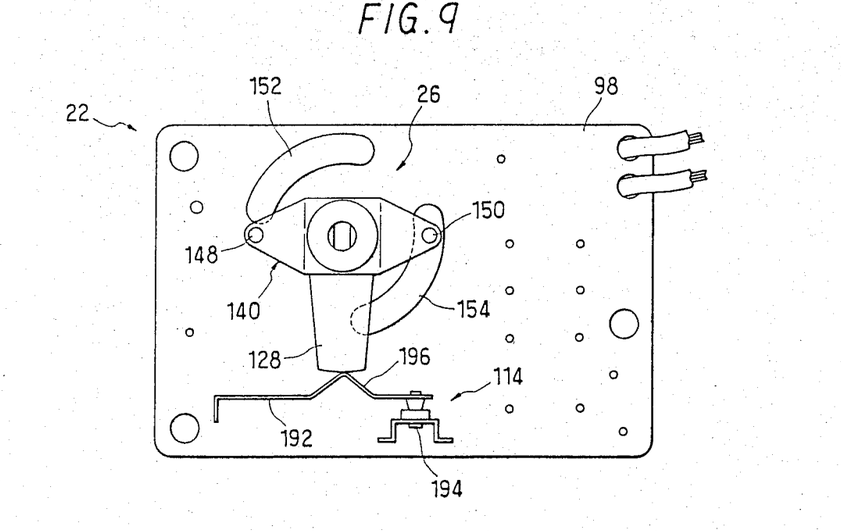
FIG. 9 is a view similar to FIG. 7 excepts that the control circuit board is shown in the state when the lamp cover is open.
Figure 10:
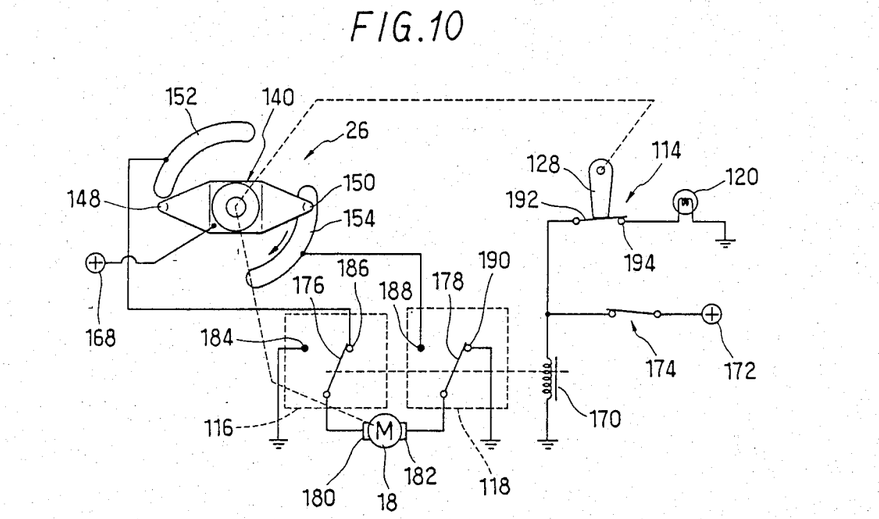
FIG. 10 is a diagram similar to FIG. 8 except that the control circuit is shown in the state when the lamp cover is open.

The electrical details of the control circuit assembly 22 will become apparent from an inspection of FIGS. 8 and 10 taken together with FIGS. 7 and 9. FIGS. 7 and 8 show the control circuit conditions when the lamp cover 12, FIG. 1, is closed, and FIGS. 9 and 10 show the control circuit conditions when the lamp cover is open.

The motor switch 26, mechanically constructed as explained in the preceding chapter, comprises the movable contact member 140 connected to the power supply 168 and having the first 148 and second 150 movable contacts formed thereon in electrically conducting relation with each other, and the first 152 and second 154 fixed contacts for relative sliding engagement with the movable contact member 140. Being driven by the drive shaft 74 coupled also to the lamp cover 12, the movable contact member 140 rotates approximately 90 degrees with the pivotal motion of the lamp cover between the open and closed positions.

When the lamp cover 12 is closed, the movable contact member 140 of the motor switch 26 is in the position of FIGS. 7 and 8, with the first movable contact 148 in engagement with the first fixed contact 152 and with the second movable contact 150 out of engagement with the second fixed contact 154. The first movable contact 148 travels in sliding engagement with the first fixed contact 152 during the pivotal motion of the lamp cover 12 from the closed toward the open position and, as depicted in FIGS. 9 and 10, rides off the first fixed contact before the lamp cover reaches the open position.

The second movable contact 150, on the other hand, of the motor switch 26 has ridden onto the second fixed contact 154 following the commencement of the above lamp cover excursion from the closed toward the open position and remains in engagement with the second fixed contact when the lamp cover is open. Accordingly, the second movable contact 150 travels in sliding engagement with the second fixed contact 154 during the return excursion of the lamp cover from the open toward the closed position and rides off the second fixed contact before the lamp cover reaches the closed position.

Closely associated with the motor switch 26 are the first 116 and the second 118 motor direction switches, or relay contact arrangements, of single pole, double throw configuration which are activated by a common relay 170. A reference back to FIGS. 2 and 3 will reveal that this relay 170 is mounted on that side of the circuit board 98 which is away from the drive assembly 16. As shown in FIGS. 8 and 10, the relay 170 is grounded on one hand and, on the other hand, connected to a positive power supply 172 via a lamp/cover control switch 174. The lamp/cover control switch 174 is a manual switch disposed within easy reach of the vehicle driver. Normally held open to hold the light source 120 unlit, and to hold the lamp cover 12 closed, the lamp/cover control switch 174 is to be closed for opening the lamp cover and, in consequence, for lighting up the light source, as will be better understood as the description proceeds.

The manual actuation and deactuation of the lamp-/cover control switch 174 results in the energization and deenergization of the relay 170 and hence in the joint displacement of the two movable contacts 176 and 178 of the two motor direction switches 116 and 118. These movable contacts are connected respectively to a pair of opposite polarity terminals 180 and 182 of the drive motor 18 within the housing 70, FIGS. 2 and 3, of the drive assembly 16. Further the first motor direction switch 116 has a first fixed contact 184, which is grounded, and a second fixed contact 186 connected to the first fixed contact 152 of the motor switch 26. The second motor direction switch 118 likewise has a first fixed contact 188, which is connected to the second fixed contact 154 of the motor switch 26, and a second fixed contact 190 which is grounded.

When the relay 170 is unenergized, with the lamp-/cover control switch 174 held open as in FIG. 8, the movable contact 176 of the first motor direction switch 116 is in engagement with the first fixed contact 184, whereas the movable contact 178 of the second motor direction switch 118 is in engagement with the first fixed contact 188. The movable contacts 176 and 178 are actuated into engagement with the second fixed contacts 186 and 190, respectively, upon energization of the relay 180 as a result of the closure of the lamp/cover control switch 174.

The lamp/cover control switch 174 is so named because the activation of this switch results both in the opening of the lamp cover 12 and in the glowing of the light source 120. According to this invention, however, the closure of the lamp/cover control switch 174 does not immediately result in the glowing of the light source 120.

As indicated in both FIGS. 8 and 10, the lamp switch 114 for the on/off control of the light source 120 has a movable contact 192 connected to the positive power supply 172 via the lamp/cover control switch 174, and a fixed contact 194 grounded via the light source 120. The mechanical construction of the lamp switch 114 is as illustrated in FIGS. 7 and 9. The movable contact 192 takes the form of a cantilevered blade mounted on the circuit board 98. The blade 192 is self biased to normally remain out of engagement with the fixed contact 194. A lump 196 on the blade 192 is to be pushed by the actuator arm 128 for the engagement of the movable contact with the fixed contact 194, as illustrated in FIG. 9. It will be recalled by referring back to FIG. 6 that the actuator arm 128 forms an integral part of the rotary switch actuator member 82 driven by the drive shaft 74. The actuator arm 128 pushes the blade 192 into engagement with the fixed contact 194 when the lamp cover 12 is more or less fully opened, thereby causing the light source 120 to glow.

Operation

It is understood that the electric control circuit of the lamp cover drive mechanism 14 is normally conditioned as illustrated in FIGS. 7 and 8, holding the lamp cover 12 in the closed position on the lamp housing 30. The vehicle drive may actuate and close the lamp/cover control switch 174 for lighting up the combined fog and cornering lamp assembly 10. The closure of the switch 174 will result in the energization of the relay 170, with the consequent displacement of the movable contacts 176 and 178 of the motor direction switches 116 and 118 out of engagement with their first fixed contacts 184 and 188 and into engagement with their second fixed contacts 186 and 190.

Thereupon the drive motor 18 of the drive assembly 16 will be set into rotation in a predetermined forward direction as the motor energization circuit is established which comprises the anode of the power supply 168, movable contact member 140 of the motor switch 26, first movable contact 148 on the movable contact member 140, first fixed contact 152, second fixed contact 186 and movable contact 176 of the first motor direction switch 116, terminals 180 and 182 of the drive motor 18, movable contact 178 and second fixed contact 190 of the second motor direction switch 118, and the ground.

The forward rotation of the drive motor 18 will be transmitted through the gearing 72 and torque limiter 20 to the drive shaft 74, provided, of course, that the lamp cover 12 is not jammed. The lamp cover 12 will then pivot from the closed toward the open position for uncovering the lens 32 of the lamp assembly 10.

Besides being coupled at one end to the lamp cover 12, the drive shaft 74 has its other end drivingly engaged with the rotary switch actuator member 82 of the control circuit assembly 22. Therefore, with the pivotal motion of the lamp cover 12 from the closed toward the open position, both the lamp switch actuator arm 128 formed integral with the switch actuator member 82 and the motor switch contact member 140 affixed to the switch actuator member 82 will rotate from their FIGS. 7 and 8 position toward that of FIGS. 9 and 10.

Accordingly, as illustrated in FIGS. 9 and 10, the lamp switch actuator arm 128 will engage and push the movable contact 192 of the lamp switch 114 into engagement with the fixed contact 194 when (or, preferably, shortly before) the lamp cover 12 reaches the open position. The light source 120 will be thus lit up when, or immediately before, the lamp assembly 10 is uncovered.

The first movable contact 148 on the movable motor switch contact member 140, on the other hand, will ride off the first fixed contact 152, with the consequent deenergization of the drive motor 18, before the lamp cover 12 reaches the open position. However, by this time, the two way biasing mechanism 60 has started to bias the lamp cover 12 toward the open position, so that the lamp cover will pivot to that position under the force of the tension spring 64 without being driven by the drive motor 18. The lamp cover 12 will reach the open position as the crank arm 62 of the two way biasing mechanism 60 hits the stop 69.

The angular position of the movable motor switch contact member 140 is as depicted in FIGS. 9 and 10. The second movable contact 150 on this contact member 140 has ridden onto the second fixed contact 154 after the beginning of the pivotal motion of the lamp cover 12 from the closed toward the open position. Further, since the rotation of the rotary switch actuator member 82 is also arrested in the position of FIGS. 9 and 10, the lamp switch actuator arm 128 will remain in engagement with the movable contact 196, holding the lamp switch 114 closed and the light source 120 glowing.

The vehicle driver may deactuate and open the lamp-/cover control switch 174 for putting out and reclosing the lamp assembly 10. With the relay 170 thus deenergized, the movable contacts 176 and 178 of the motor direction switches 116 and 118 will move into reengagement with their first fixed contacts 184 and 188. Since the motor switch contact member 140 is now in engagement with the second fixed contact 154 via the second movable contact 150, the drive motor 18 will now be energized in the reverse direction through the circuit comprising the anode of the power supply 168, motor switch contact member 140, second movable contact 150 on the movable contact member 140, second fixed contact 154, first fixed contact 188 and movable contact 178 of the second motor direction switch 118, terminals 182 and 180 of the drive motor 18, movable contact 176 and first fixed contact 184 of the first motor direction switch 116, and the ground.

The reversed rotation of the drive motor 18 will result in the return travel of the lamp cover 12 from the open toward the closed position. The lamp switch actuator arm 128 will release the movable contact 196 to open the lamp switch 114 and hence to put out the light source 120 shortly after the lamp cover 12 starts its travel toward the closed position. The second movable contact 150 on the motor switch contact member 140 will ride off the second fixed contact 154 after the lamp cover 12 travels past the midpoint between the open and closed positions, with the consequent deenergization of the drive motor 18. Thereafter, urged by the two way biasing mechanism 60, the lamp cover will return to the closed position and will be held there as the crank arm 62 of the two way biasing mechanism engages the stop 68. Now the control circuit has returned to the state of FIGS. 7 and 8.

Notwithstanding the foregoing detailed disclosure, the present invention is not to be limited by the exact details of the exemplified embodiment. Various modifications of the embodiment may be resorted to without departing from the scope of this invention.

What is claimed is:

1. A lighting device for vehicular use, comprising:
   (a) a lamp assembly comprising:
      (1) a lamp housing having a front side; and
      (2) a light source within the lamp housing for providing illumination through the front side thereof;
   (b) a lamp cover mounted to the lamp housing of the lamp assembly for pivotal motion between an open position, where the lamp cover uncovers the front side of the lamp housing, and a closed position where the lamp cover covers the front side of the lamp housing;
   (c) a lamp cover drive mechanism mounted to the lamp housing of the lamp assembly for pivoting the lamp cover between the open and closed positions, the lamp cover drive mechanism comprising:
      (1) a reversible electric drive motor;
      (2) a drive shaft coupled to the lamp cover for pivoting the same between the open and closed positions by being driven by the drive motor; and
      (3) a torque limiter interposed between the drive motor and the drive shaft for protecting the drive motor from overloading, the torque limiter normally causing the drive motor to drive the drive shaft and permitting the drive motor to rotate independently of the drive shaft upon jamming of the lamp cover; and
   (d) an electric control circuit comprising:
      (1) a lamp/cover control switch;
      (2) first circuit means responsive to the actuation of the lamp/cover control switch for causing the drive motor of the lamp cover drive mechanism to rotate in a predetermined direction to an extent necessary for pivoting the lamp cover from the closed to the open position, the first circuit means being further responsive to the deactuation of the lamp/cover control switch for causing the drive motor to rotate in an opposite direction to an extent necessary for pivoting the lamp cover from the open to to the closed position; and
      (3) second circuit means associated with the first circuit means for lighting up the light source of the lamp assembly when the lamp cover is in the open position.

2. A lighting device as set forth in claim 1, wherein the torque limiter of the lamp cover drive mechanism comprises:
   (a) a drive disc loosely mounted on the drive shaft and adapted to be forcibly driven by the drive motor;
   (b) a driven disc fixedly mounted on the drive shaft and disposed opposite the drive disc;
   (c) resilient means for normally yieldably holding the drive and driven discs in face to face contact with each other;

(d) a plurality of convexities formed on either of the drive and diven discs and disposed annularly at constant angular spacings about the axis of the drive shaft; and (e) there being a plurality of concavities formed in the other of the drive and diven discs and disposed annularly at constant angular spacings about the axis of the drive shaft, the convexities and concavities being normally interengaged to allow the drive disc to drive the driven disk under pressure from the resilient means and, upon jamming of the lamp cover, being disengaged against the force of the resilient means to allow the drive disc to rotate independently of the driven disc.

3. A lighting device as set forth in claim 2, wherein the lamp cover drive mechanism further comprises gear means for transmitting the rotation of the drive motor to the drive shaft via the torque limiter, the gear means including a final gear of rigid plastic material loosely mounted on the drive shaft, and wherein the drive disc of the torque limiter is made of metal and is coaxially secured to the final gear of the gear means.

4. A lighting device as set forth in claim 1, wherein the lamp cover is coupled at one end to the drive shaft of the lamp cover drive mechanism for pivotal motion about the axis of the drive shaft, and wherein the lighting device further comprises a two way biasing mechanism for biasing the lamp cover toward the open or closed position depending upon the angular position of the lamp cover with respect to a midpoint between the open and closed positions, the two way biasing mechanism biasing the lamp cover toward the open position when the lamp cover is closer to the open position than to the closed position, and toward the closed position when the lamp cover is closer to the closed position than to the open position.

5. A lighting device as set forth in claim 4, wherein the two way biasing mechanism comprises:
(a) a trunnion rotatably mounted to the lamp housing of the lamp assembly and nonrotatably coupled to another end of the lamp cover in coaxial relation with the drive shaft;
(b) stop means on the lamp housing for limiting the rotation of the trunnion in the open and closed positions of the lamp cover; and
(c) resilient means acting between the trunnion and the lamp housing for biasing the lamp cover toward the open or closed position depending upon the angular position of the lamp cover therebetween, the resilient means being neutralized when the lamp cover is at the midpoint between the open and closed positions.

6. A lighting device as set forth in claim 4, wherein the first circuit means of the electric control circuit comprises:
(a) a motor switch comprising first and second fixed contacts disposed adjacent the drive shaft of the lamp cover drive mechanism;
(b) a movable contact member also forming a part of the motor switch and adapted for joint rotation with the drive shaft of the lamp cover drive mechanism, the movable contact member having first and second movable contacts formed thereon in electrically conducting relation with each other, the first movable contact travelling in sliding engagement with the first fixed contact of the motor switch during the pivotal movement of the lamp cover from the closed toward the open position and disengaging the first fixed contact before the lamp cover reaches the open position, the second movable contact travelling in sliding engagement with the second fixed contact of the motor switch during the pivotal movement of the lamp cover from the open toward the closed position and disengaging the second fixed contact before the lamp cover reaches the closed position;
(c) a power supply electrically connected to the movable contact member of the motor switch;
(d) a first motor direction switch responsive to the actuation and deactuation of the lamp/cover control switch for selectively connecting one of a pair of opposite polarity terminals of the drive motor to the first fixed contact of the motor switch and to ground; and
(e) a second motor direction switch also responsive to the actuation and deactuation of the lamp/cover control switch for selectively connecting the other of the opposite polarity terminals of the drive motor to the second fixed contact of the motor switch and to the ground.

7. A lighting device as set forth in claim 1, wherein the second circuit means of the electric control circuit comprises:
(a) a lamp switch for the on/off control of the light source of the lamp assembly, the lamp switch being normally open for holding the light source unlit; and
(b) a lamp switch actuator capable of joint rotation with the drive shaft of the lamp cover drive mechanism and adapted to close the lamp switch, and hence to cause the light source to be lit up, when the lamp cover is pivoted from the closed to the open position.

8. A lighting device as set forth in claim 1, wherein the lamp cover drive mechanism and the electric control circuit are compactly mounted within the lamp housing of the lamp assembly.

* * * * *